3,438,924
AGGLOMERATION AND CONCENTRATION OF SYNTHETIC LATEX

David Calder Chalmers and Joseph Maxwell Mitchell, Sarini, Ontario, Canada, assignors to Polymer Corporation Limited, Sarnia, Ontario, Canada, a body corporate
No Drawing. Continuation of application Ser. No. 338,595, Jan. 20, 1964. This application Sept. 1, 1967, Ser. No. 665,185
Claims priority, application Canada, Feb. 8, 1963, 868,355
Int. Cl. C08d 7/02
U.S. Cl. 260—29.7                                   7 Claims

ABSTRACT OF THE DISCLOSURE

Rubbery diene-polymer particles in a latex can be agglomerated by adding to the latex a small amount of a water-soluble compound prepared by reacting a polyethylene glycol of molecular weight about 1,000–20,000 with the diepoxide obtained by reacting epichlorohydrin with a polyhydric phenol. The latex now can be readily concentrated to high solids while maintaining a low viscosity.

---

This application is a continuation of copending application Ser. No. 338,595, Jan. 20, 1964, now abandoned.

This invention relates to a process for increasing the average particle size of synthetic polymer latexes to enable the latexes to be concentrated to higher solids concentrations.

For many applications, particularly in the manufacture of latex foam rubber, a high solids, low viscosity latex is required. Such latexes have heretofore been produced by a number of different methods, such as, polymerization directly to a high solids content; chemically agglomerating a preformed latex to increase its average particle size by blending with a salt or vegetable micilage, and then concentrating to a high solids content by evaporating the water or by creaming; by freezing and thawing the preformed latex under controlled conditions to agglomerate the particles to a higher average particle size and then concentrating the thawed latex, etc. While these processes have been employed with varying degrees of success, alternate and simpler processes are deemed to be desirable to overcome the high viscosity, latex stability, cost and other problems variously characteristic of the prior processes.

It has now been discovered that the addition to the synthetic latex, of a small amount of a compound of the general formula $$R_x[(CH_2CH_2O)_n]_y$$

where R is a hydrophobic organic group, $n$ is 23–455 and the ratio $x:y$ is 1:3 to 2:1 and preferably of the product obtained by reacting a polyoxyalkylene glycol with the diepoxide obtained by condensing epichlorohydrin with a polyhydric phenol will effect the desired agglomeration of the dispersed polymer particles in the latex. The thus treated latex is mechanically stable and can be concentrated to a higher solids content than is possible in the absence of such treatment.

A convenient method for classifying the adaptability of a synthetic latex to concentration is by measuring the percent solids obtained on concentrating the latex to a viscosity of 12 poises as measured at 25° C. on a Brookfield Model LVF Viscometer using the #3 spindle at 30 r.p.m. This value will hereinafter be referred to as the 12-poise solids or percent solids at 12 poises. Thus the dispersed polymer particles in a lower solids, relatively small average particle size latex may, by the process of this invention, be agglomerated to a larger average particle size and the latex concentrated to a higher solids at an equivalent low viscosity, i.e. to a higher 12-poise solids.

In carrying out the present invention, there is added to the synthetic latex, about 0.0005–1.0 and preferably 0.001–1.0 and more preferably about 0.001–0.15 and most preferably 0.005–0.10 part by weight of the agglomerating agent per 100 parts by weight of the original polymer solids in the unconcentrated latex. It is preferable to add the agglomerating agent with good agitation in the form of an aqueous solution also containing a dissolved dispersing agent which functions to control the agglomerating effect and thus prevent excessive coagulum formation during concentration of the latex. The dispersing agent also acts to minimize the degree of creaming after the latex has been concentrated. Dispersant usage may be within the range of about 0.1–10.0 parts by weight per 100 parts by weight of polymer solids but is preferably 0.5–5.0 parts by weight. Alternatively, the solution of agglomerating agent may be added to a heated latex which may then be concentrated or allowed to stand in a quiescent or agitated state until the concentration step is undertaken. As is well known, synthetic latexes are conventionally prepared by the polymerization, in aqueous media, of emulsified polymerizable monomers. Thus, it has been found that another alternative method of attaining the agglomerating effect is to add the solution of the agglomerating agent to the reactor in which the latex is being prepared, such addition being made prior to or after the initiation of the polymerization reaction.

The latexes which may be agglomerated are of synthetic polymers which are rubbery or resinous in character. They may be prepared by the polymerization of vinylidene monomers i.e. monomers containing a $$CH_2=C<$$

structure in aqueous emulsion by methods which are well known in the art. For example, vinylidene monomers such as butadiene-1,3, 2-methyl butadiene-1,3, 2,3-dimethyl butadiene-1,3 and 1-methyl butadiene-1,3, each of which is herein considered to be "a butadiene-1,3," styrene, alpha-methyl styrene, para-methyl styrene, chlorostyrene, acrylonitrile, vinyl chloride, vinylidene chloride, vinyl pyridene, divinyl benzene etc. may be homopolymerized or copolymerized one with another to form rubbery or resinous polymers. Conventionally, these polymerizable monomers are emulsified in an aqueous medium by means of an emulsifying agent which can be one or more of a soap such as an alkali metal salt of a saturated or unsaturated carboxylic acid such as an alkali metal stearate, oleate, etc., or a rosin acid soap such as an alkali metal abietate or other suitable surface active agents such as the sodium or potassium salts of the condensation product of beta-naphthalene sulfonic acid and formaldehyde, alkali metal salts of alkyl aryl sulfonates, ethylene oxide condensates with alkyl phenols etc. The polymerization is made to take place by the addition of a suitable catalyst at suitably controlled temperatures. Peroxygen catalysts such as persulfates and hydroperoxides are usually employed and the polymerization temperature may vary from about 2–120° C. When the desired degree of polymerization is reached, the reaction is stopped. The unreacted monomers are then usually removed, although agglomeration is obtained with unstripped latex also. In the latter case the unreacted monomers will be removed with the water during concentration.

Latexes prepared in this manner normally have a total solids content of about 15–45% by weight and average particle sizes of about 400–1000 or more angstroms. In the absence of the agglomerating agent, they may be concentrated to about 45–50% solids at 12 poises. The latexes may be agglomerated individually or they may be blended before the agglomeration is carried out. In some cases up to about 10 parts by weight of an oil are also added. After agglomeration, the latexes may be concentrated to as high as 70% or higher solids at 12 poises.

Compounds described by the general formula $$-R_x[(CH_2CH_2O)_n]_y-$$

where R is a hydrophobic organic group, $n$ is 23–455 and the ratio of $x:y$ is 1:3 to 2:1 have been found to have an agglomerating effect. To have a suitable effect the compounds should be soluble in water. The hydrophobic groups designated by R which have been found to be suitable include aromatic di-isocyanates, stearoyl, oleoyl and lauroyl groups, nonyl phenol-toluene di-isocyanate reaction products and bisphenol-epichlorohydrin reaction products. The aromatic hydrophobic groups are preferred since they appear to have better adsorption on the polymer particle surface. It is interesting to note that no significant agglomerating effect was obtained when polyethylene oxide of molecular weight 20,000 and containing no hydrophobic organic group was tested.

The preferred class of agglomerating agents may be prepared by first reacting epichlorohydrin with a polyhydric phenol to form a diepoxy polymer where the epoxy groups are in the terminal positions on the polymer molecules, and then reacting this diepoxide with a polyoxyalkylene glycol to form the agglomerating agent. The polyhydric phenol is preferably a p,p′-alkylidene diphenol such as 2,2-bis(4-hydroxy phenyl) propane, 2,2′-bis(4-hydroxy phenyl) butane, 2,2′-bis(4-hydroxy phenyl) pentane etc., and the preferred polyoxyalkylene glycol is polyoxyethylene glycol having a molecular weight of about 6000. The preferred agglomerating agent is prepared by reacting epichlorohydrin with 2,2-bis(4-hydroxy phenyl) propane to form a diepoxide in which one mole of the 2,2-bis(4-hydroxy phenyl) propane is combined with two moles of epichlorohydrin, and then reacting this diepoxide with polyoxyethylene glycol (molecular weight about 6000) to form the agglomerating agent. A material available commercially under the trademark "Carbowax 20M" has been found to be an effective agglomerating agent. It is believed to be the reaction product obtained by chain extending or crosslinking polyoxyethylene glycol of molecular weight 6000 with the diepoxide formed from 2,2-bis(4-hydroxy phenyl) propane with two moles of epichlorohydrin, to a molecular weight of about 15,000–20,000.

While being effective in causing agglomeration of latex particles, there is some tendency towards coagulum formation when aqueous solutions of the agglomerating agents are added to the latex. This may be overcome by the addition of a small amount, i.e. 0.1–10 parts and preferably 0.5–5.0 parts, based on the polymer content, of extra emulsifier to the latex, the addition being made either directly to the latex or with the agglomerating agent solution. The addition of excessively large amounts of extra emulsifier is undesirable since it affects the foaming and gelling properties of the concentrated latex, and changes in the compounding recipe are required to retain optimum properties in the foamed latex. The addition of potassium oleate or a sodium salt of the condensation product of beta-naphthalene sulfonic acid with formaldehyde has been found to be particularly effective.

The following examples are given to illustrate the invention more fully.

EXAMPLE I

A synthetic rubber latex was prepared by copolymerizing, in aqueous emulsion, 72 parts by weight of butadiene-1,3 with 28 parts by weight of styrene in the following recipe.

|  |  | Parts |
|---|---|---|
| Monomers | Butadiene-1,3 | 72 |
|  | Styrene | 28 |
| Water |  | 130 |
| Emulsifier | Potassium oleate | 3.5 |
|  | Daxad 11 SPN [1] | 0.1 |
|  | Na$_3$PO$_4$.12H$_2$O | 0.40 |
|  | KCl | 0.40 |
| Modifier | Kalex acid [2] | 0.02 |
|  | Na$_2$S$_2$O$_4$.2H$_2$O | 0.02 |
|  | Tertiary dodecyl mercaptan | 0.03 |
| Catalyst | Di-isopropylbenzene hydroperoxide | 0.05 |
| Activator | Fe SO$_4$.7H$_2$O | 0.002 |
|  | Na$_3$PO$_4$.12H$_2$O | 0.005 |
|  | Sodium formaldehyde sulfoxylate | 0.009 |
|  | Kalex acid | 0.004 |

[1] Sodium salt of beta-naphthalene sulfonic acid condensed with formaldehyde.
[2] Ethylenediamine tetraacetic acid.

The polymerization was carried out at about 7° C. When the conversion of monomers had reached 70% the reaction was stopped by the addition of 0.075 part of sodium dimethyl dithiocarbamate and the unreacted monomers were stripped from the latex. The latex had a total solids content of 35.5% and a number average particle size of about 500 Angstroms while the polymer had a bound styrene content of 22%. When a sample of the latex was heated to about 37° C. and concentrated slowly under a vacuum of about 28 inches of mercury to a viscosity of 12 poises using a disc concentrator, it was found that the highest percent solids obtainable was 48.0 in the absence of any agglomerating agent.

Various amounts of solution of Carbowax 20M agglomerating agent and Daxad 11 SPN were added to samples of the unconcentrated latex, the addition being made slowly while maintaining each sample of latex under good agitation. Each sample was then concentrated to determine its 12-poise solids. The results are summarized in Table I. All parts are parts by weight per 100 parts total solids in the original latex.

TABLE I

| Agglomerating agent (parts) | Daxad 11 SPN (parts) | 12-poise solids (percent) |
|---|---|---|
|  |  | 48.0 |
| 0.1 | 2.0 | 68.0 |
| 0.05 | 2.0 | 72.5 |
| 0.025 | 2.0 | 70.5 |
| 0.0125 | 2.0 | 71.0 |
| 1.0 | 1.0 | 60.0 |
| 0.01 | 1.0 | 70.5 |
| 0.005 | 1.0 | 60.0 |
| 0.01 |  | 60.0 |

The sample of latex to which 0.05 part agglomerating agent was added had particles which varied in size from about 500–10,000 Angstroms.

These results indicate that the addition of as much as 1.0 part and as little as 0.005 part of the agglomerating agent permits the latex to be concentrated to a significantly higher 12-poise solids.

EXAMPLE II

A portion of the untreated latex prepared in Example I was blended with a polystyrene resin latex, polymerized at 40° C. using a potassium persulfate catalyst and a potassium oleate emulsifier, so as to obtain a latex blend containing 15 parts by weight of polystyrene resin per 100 parts by weight of butadiene-styrene copolymer rubber. Samples of this latex blend were concentrated with and without pretreatment with varying amounts of Carbowax 20M agglomerating agent. The results are summarized in Table II.

TABLE II

| Agglomerating agent (parts) | Daxad 11 SPN (parts) | 12-poise solids (percent) |
|---|---|---|
|  |  | 50.0 |
| 0.01 | 1.0 | 56.7 |
| 0.02 | 1.0 | 59.0 |
| 0.05 | 1.0 | 62.3 |

These results show that the agglomerating agent is effective for blends of latexes of rubbery and resinous polymers.

EXAMPLE III

A latex of an oil-resistant rubbery copolymer containing 80% butadiene-1,3 and 20% acrylonitrile was prepared using the polymerization recipe of Example I. Samples of this latex were concentrated with and without pretreatment with the Carbowax 20M agglomerating agent. The untreated latex could be concentrated from the original 28.0% solids to only 46.0% solids when the viscosity reached 12 poises but when pretreated with 0.15 part of the agglomerating agent and 1.0 parts of Daxad 11 SPN dispersing agent per 100 parts of rubbery polymer, the latex could be concentrated to a 12-poise solids of 64.3%.

EXAMPLE IV

A latex of a rubbery polymer was prepared as in Example I except that the emulsifier was a mixture of equal parts of potassium stearate and Dresinate 214. Dresinate 214 is a trademark for a rosin soap comprised of a mixture of the potassium salts of dehydro-, dihydro- and tetrahydroabietic acids. The latex had a total solids content of 24.0% and could be concentrated to a 12 poise solids of only 46.0% in the absence of agglomerating agent. When 0.15 part of Carbowax 20M agglomerating agent and 1.0 part of Daxad 11 SPN dispersing agent per 100 parts of rubbery polymer were added to the latex before concentration, the latex could be concentrated to a 12 poise solids of 66.0%.

EXAMPLE V

A latex of a terpolymer composed of butadiene-1,3, styrene and divinylbenzene was prepared by copolymerizing the monomers at 52° C. using the following recipe:

| | Parts by weight |
|---|---|
| Butadiene-1,3 | 75 |
| Styrene | 24.75 |
| Divinylbenzene | 0.25 |
| Water | 180 |
| Sodium stearate | 5.6 |
| Potassium persulfate | 0.3 |
| Mixed tertiary mercaptans (60/20/20-tertiary $C_{12}/C_{14}/C_{16}$ mercaptans) | 0.45 |
| Conversion, 90% | |
| Total solids in latex, 35.0% | |

Samples of the latex were concentrated with and without pretreatment with varying amounts Carbowax 20M agglomerating agent. The results are summarized in Table III.

TABLE III

| Agglomerating agent (parts) | Daxad 11 SPN (parts) | 12-poise solids (percent) |
|---|---|---|
|  |  | 44.0 |
| 0.01 | 1.0 | 55.0 |
| 0.02 | 1.0 | 65.0 |
| 0.10 | 1.0 | 66.3 |
| 0.20 |  | 57.0 |

EXAMPLE VI

The following compounds were found to have an agglomerating effect on the polymer particles in the latex of Example I and such latex could be concentrated to higher % solids at 12 poises than could be obtained in the absence of the agglomeration treatment:

(a) The product formed by reacting one mole of polymethylene polyphenyl isocyanate with three moles of polyoxyethylene glycol of 6000 molecular weight. The addition of 0.01 part by weight of this product to the latex per 100 parts by weight of latex solids along with 1.0 part of Daxad 11 SPN caused agglomeration of the latex polymer particles to permit the latex to be concentrated to a 12 poises solids of 63.5%.

(b) The product formed by reacting one mole of polymethylene polyphenyl isocyanate with three moles of polyoxyethylene glycol of 20,000 molecular weight. 0.1 part of this material was used and the latex could be concentrated to 65.0% solids at 12 poises.

(c) The product formed by reacting nonyl phenol, polyoxyethylene glycol of 20,000 molecular weight and toluene di-isocyanate containing 65% 2,4-isomers and 35% 2,6-isomers, in the molar ratio of 1/1/1 with the aid of $AlCl_3$ catalyst. When 0.1 part of this material was used the latex could be concentrated to 64.5% solids at 12 poises.

(d) The product formed by reacting nonyl phenol, polyoxyethylene glycol of 6000 molecular weight and toluene di-isocyanate containing 65% 2,4-isomers and 35% 2,6-isomers, in the molar ratio of 1/1/1 with the aid of $AlCl_3$ catalyst. When 0.25 part of this material was used the latex could be concentrated to 64.0% solids at 12 poises.

(e) When 0.1 part respectively of each of the monolaurate, monostearate and monooleate of polyoxyethylene glycol of molecular weight 6000 were used along with 1.5, 0.5 and 0.5 parts respectively of sodium sulphate, the latex could be concentrated to 65.0, 58.0 and 60.0% solids at 12 poises.

A unique feature of the agglomerated latexes of this invention is based on the manner in which the agglomeration takes place. With the present agglomerating agents the polymer particles are caused to cluster into larger units; but if the viscosity of the polymer is not excessively low, substantial dilution with an aqueous emulsifier solution causes the clusters to break up into the individual polymer particles from which they were formed. The agglomerated latexes exhibit the sharp drop in viscosity characteristic of latex agglomeration, but there is no creaming in the absence of excessive amounts of agglomerating agent. There is little irreversible coalescence or fusion of polymer particles when the melt viscosity of the polymer is above a value equivalent to an ML-4-100° C. Mooney viscosity of about 130.

What is claimed is:

1. The process for agglomerating the polymer particles of an aqueous latex comprising rubbery polymer particles of a butadiene-1,3 monomer which comprises dispersing in said latex an agglomerating compound prepared by reacting a polyoxyethylene glycol described by the formula HO—$(CH_2—CH_2—O)_n$—H where $n$ is 23–455 with the diepoxide prepared by reacting epichlorohydrin with a polyhydric phenol, said agglomerating compound being added in amount of 0.0005–1.0 part by weight per 100 parts by weight of the rubbery polymer in the latex, the proportion of diepoxide reacted with the polyoxyethylene glycol being in the ratio of 1:3 to 2:1 respectively and concentrating the latex by the removal of water therefrom.

2. The process as claimed in claim 1 wherein the agglomerating compound is added to the latex in the presence of added dispersing agent selected from the group consisting of the sodium salt of the condensation product of betanaphthalene sulfonic acid with formaldehyde and the potassium salt of oleic acid added in amount of 0.5–5.0 parts by weight per 100 parts by weight of rubbery polymer in the latex.

3. The process as claimed in claim 2 wherein the agglomerating compound is the reaction product of a polyoxyethylene glycol of molecular weight of about 6000 with the diepoxide obtained by reacting epichlorohydrin with a p,p¹-alkylidene diphenol.

4. The process as claimed in claim 3 wherein the p,p¹-alkylidene diphenol is 2,2-bis(4-hydroxy phenyl) propane and the agglomerating compound has a molecular weight of 15,000–20,000.

5. The process as claimed in claim 4 wherein said rubbery polymer comprises a copolymer of a butadiene-1,3 with styrene.

6. The process as claimed in claim 4 wherein said rubbery polymer comprises a copolymer of a butadiene-1,3 with acrylonitrile.

7. The process as claimed in claim 4 wherein the polymer particles comprise a mixture of particles of a rubbery copolymer of a butadiene-1,3 with styrene and particles of resinous polymer comprising polymerized styrene.

References Cited
UNITED STATES PATENTS 3,228,906  1/1966  Schluter et al. _____ 260—29.7

OTHER REFERENCES

Union Carbon and Carbide, Physical Properties of Organic Chemicals, 1959, pp. 20–21 relied upon.

SAMUEL H. BLECH, *Primary Examiner.*

J. T. GOOLKASIAN, *Assistant Examiner.*

U.S. Cl. X.R.

260—29.6, 837